(12) United States Patent
Fioriello

(10) Patent No.: US 11,005,248 B2
(45) Date of Patent: *May 11, 2021

(54) ELECTRICAL BOX WITH MOVABLE ACCESS PANEL

(71) Applicant: Richard Fioriello, Staten Island, NY (US)

(72) Inventor: Richard Fioriello, Staten Island, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/691,558

(22) Filed: Nov. 21, 2019

(65) Prior Publication Data

US 2020/0119535 A1    Apr. 16, 2020

Related U.S. Application Data

(63) Continuation of application No. 16/157,616, filed on Oct. 11, 2018, now Pat. No. 10,530,141.

(51) Int. Cl.
| | |
|---|---|
| H02G 3/14 | (2006.01) |
| H02G 3/16 | (2006.01) |
| H02G 3/04 | (2006.01) |
| H02G 3/08 | (2006.01) |
| H01G 2/10 | (2006.01) |

(52) U.S. Cl.
CPC ............ *H02G 3/14* (2013.01); *H02G 3/0406* (2013.01); *H02G 3/085* (2013.01); *H02G 3/16* (2013.01)

(58) Field of Classification Search
CPC .. H01G 2/10; H02G 3/14; H02G 3/08; H02G 3/081; H02G 3/083; H02G 3/085; H02G 3/086; H02G 3/16; H02G 3/0406; H02G 3/123; H02G 3/125; H02G 3/04; H02G 15/115; H05K 5/0247
USPC ............................ 174/535, 53, 549; 220/3.94
See application file for complete search history.

(56) References Cited

U.S. PATENT DOCUMENTS

| | | |
|---|---|---|
| 3,386,606 A | 6/1968 | Pastrick |
| 4,246,436 A | 1/1981 | Hoffman et al. |
| 4,337,048 A * | 6/1982 | Hatch ...................... A61B 5/16 434/219 |
| 4,538,868 A | 9/1985 | Cruise et al. |
| 4,715,507 A * | 12/1987 | Chamberlin ........... H02G 3/123 174/53 |
| 4,805,073 A | 2/1989 | Johnson et al. |

(Continued)

*Primary Examiner* — Timothy J Thompson
*Assistant Examiner* — Guillermo J Egoavil
(74) *Attorney, Agent, or Firm* — Goldstein Law Offices, P.C.

(57) ABSTRACT

An improved access electrical box for housing electrical connections for integration with an electrical system having a conduit and a plurality of conduit wires, the electrical box comprising a plurality of box panels forming an interior space and a front opening, the electrical box further has a top opening, and a movable access panel which selectively covers and uncovers the top opening and has a wiring aperture which allows the conduit wires to be inserted into the interior space, the electric box further has an installed device having device wires, which is secured within the front opening such that the device wires extend into the interior space, the movable access panel allows a user to splice the device wires and the conduit wires through the top opening to complete the electrical connections, and is further adapted to enclose the electrical connections when the movable panel is a closed position.

10 Claims, 11 Drawing Sheets

(56) References Cited

U.S. PATENT DOCUMENTS

| | | | |
|---|---|---|---|
| 6,359,222 B1 | 3/2002 | Norvelle | |
| 7,207,830 B2 | 4/2007 | Conway | |
| 8,403,277 B2 * | 3/2013 | Nuernberger | H02G 3/08 248/200.1 |
| 8,642,885 B2 | 2/2014 | Davila et al. | |
| 9,871,362 B2 * | 1/2018 | Blaine | H05K 5/0247 |
| D871,347 S * | 12/2019 | Fioriello | D13/152 |
| 10,530,141 B1 * | 1/2020 | Fioriello | H02G 3/123 |
| 10,749,321 B1 * | 8/2020 | Ruggiero | H02G 3/083 |
| 2009/0250573 A1 | 10/2009 | Nuernberger et al. | |
| 2010/0258559 A1 | 10/2010 | Robinson et al. | |
| 2016/0099555 A1 * | 4/2016 | Nikayin | H02G 3/126 248/74.2 |
| 2018/0241188 A1 | 8/2018 | Korcz et al. | |

* cited by examiner

ELECTRICAL BOX WITH MOVABLE ACCESS PANEL

This application is a continuation of non-provisional patent application Ser. No. 16/157,616, filed in the United States Patent Office on Oct. 11, 2018, from which priority is claimed and which is incorporated herein by reference in its entirety.

TECHNICAL FIELD

The present disclosure relates generally to an electrical box for housing electrical connections. More particularly, the present disclosure relates to an improved access electrical box with a movable access panel, and methods for its use.

BACKGROUND

Electrical boxes are a key part of any electrical system and are used to house electrical connections to both protect the connections and provide a safety barrier in the event that a short circuit occurs at any of the electrical connections within the electrical box. Electrical boxes generally house an electrical device such as an electrical receptacle or outlet or a switching or protection device, and are formed as boxes with an interior space, a front opening into which the electrical device is installed, and one or more wiring holes which allow cables and wires to pass through either into or out of the interior space. Electrical boxes can be connected to an electrical system by splicing the device wires of the installed device with conduit wires from a conduit connecting the electrical box to the rest of the electrical system.

To boost efficiency and reduce the time needed to complete electrical wiring, it is increasingly common for electricians and contractors to employ prefabricated electrical boxes which are supplied already fastened to mounting brackets and with devices preinstalled within the electrical boxes secured within the front openings. The prefabricated electrical boxes are commonly supplied with the device wires protruding from one of the wiring holes. In theory, all that the electrician needs to do in order to install a prefabricated electrical box, is to secure the mounting bracket to a supporting structure such as between two wall studs, draw the conduit and the conduit wires to the device wires, perform the necessary splices to connect the device wires to the conduit wires, and push the spliced wires through the wiring hole and into the interior space of the electrical box. However, in practice, the wires are often damaged or cut due to being forced through relatively narrow wiring holes, and cut wires result in inoperative connections and short circuits, leading to extensive delays for troubleshooting and rewiring. To avoid damaging the wires, the electrician may be forced to disassemble the electrical box by removing the installed device in order to perform the necessary splices at the front opening, before reassembling the electrical box. However, disassembly and reassembly of the prefabricated box is time consuming and nullifies the advantages of employing prefabricated electrical boxes.

Therefore, a pressing need exists for an improved electrical box which allows the user to perform the necessary splices using a fully assembled electrical box without either disassembling the electrical box or forcing the spliced wires back into the interior space through the wiring holes.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an electrical box which allows a user to splice together conduit wires leading from a conduit with device wires leading from an installed device such as a switch or electric receptacle when the front opening of the electrical box is blocked by the installed device. Accordingly, the present disclosure provides an improved access electrical box having a plurality of box panels which define an interior space, a front opening adapted to receive the installed device, and a top opening through which the interior space is accessible even when access to the interior space via the front opening is blocked by the installed device.

It is another aspect of an example embodiment in the present disclosure to provide an electrical box which fully encloses the electrical connections within the interior space while also allowing the user to access the interior space as needed. Accordingly, the improved access electrical box further has a movable access panel adapted to move between a closed and an open position to selectively cover and uncover the top opening, the movable access panel further having a wiring aperture which allows the conduit and the conduit wires to be inserted into the interior space.

It is yet another aspect of an example embodiment in the present disclosure to provide an electrical box which allows the user to splice together the device wires and the conduit wires while the installed device remains secured within the front opening. Accordingly, the present disclosure further provides an improved electrical box which allows the device wires to be threaded through the front opening, into the interior space, and upwardly through the top panel, allowing the user to splice together the device wires and the conduit wires before lowering the spliced wires into the interior space and covering the top opening using the movable access panel.

It is a further aspect of an example embodiment in the present disclosure to provide an electrical box which is secured to a supporting structure prior to completing the electrical connections, Accordingly, the present disclosure further provides an electrical box and mounting bracket assembly whereby the improved access electrical box is fastened to an electrical box mounting bracket, and the electrical box mounting bracket is adapted to be secured to the supporting structure.

It is yet a further aspect of an example embodiment in the present disclosure to provide an electrical box which can house a plurality of installed devices, while also allowing the user to splice the device wires of every installed device. Accordingly, the present disclosure further provides an improved access electrical box having an expanded configuration whereby the movable access panel comprises a plurality of sub-panels, each sub-panel has a wiring aperture and is capable of independently opening and closing while the plurality of sub-panels collectively cover the top opening. The expanded configuration allows the improved access electrical box to receive one or more additional installed devices, whereby the device wires of each additional installed device are threaded through the interior space and the top opening, allowing the user to splice the device wires of each additional installed device with the conduit wires through the wiring aperture of one of the sub-panels.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
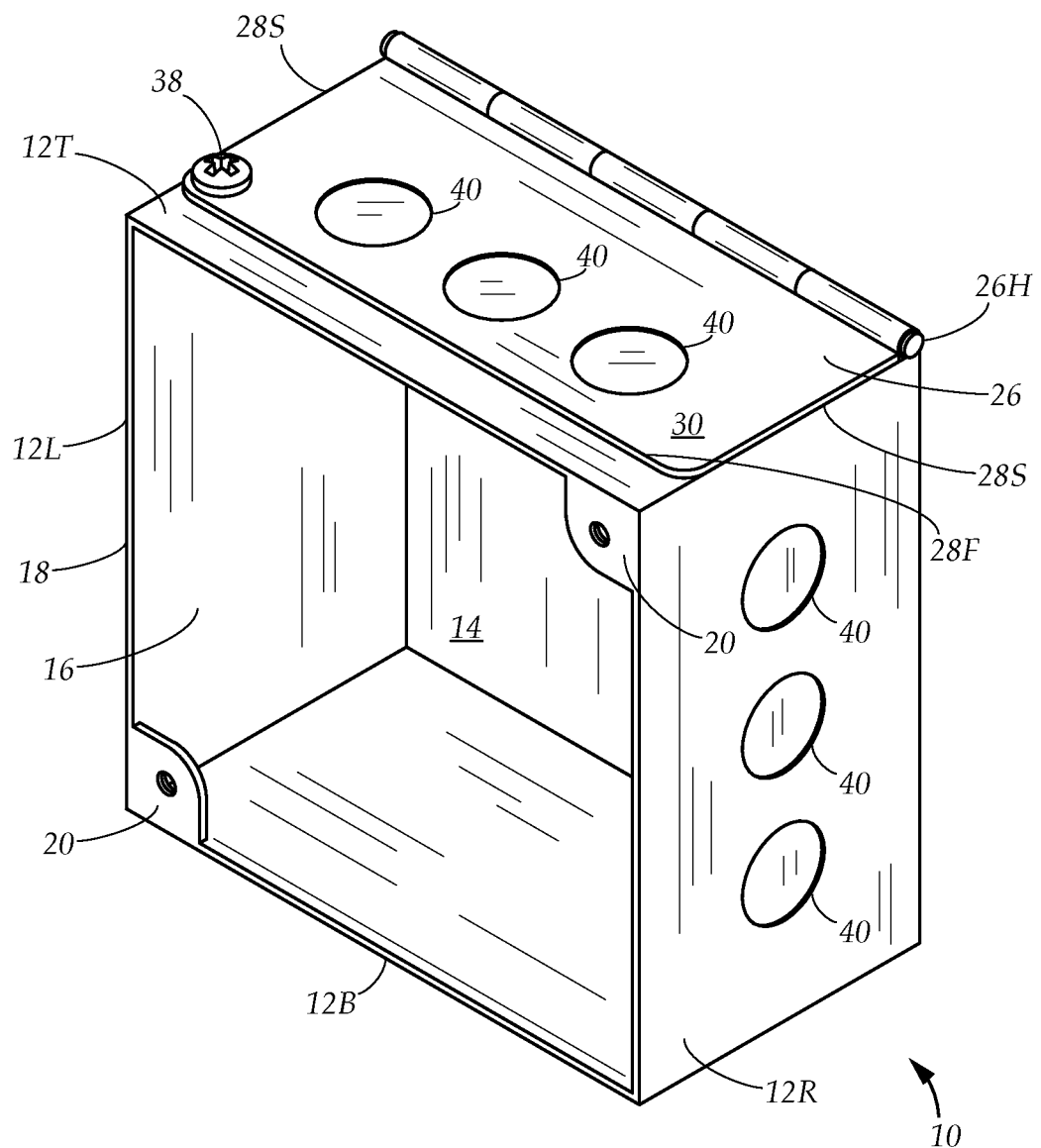
FIG. 1 is a diagrammatical perspective view showing an improved access electrical box having a movable access panel, in accordance with an embodiment of the present disclosure.
Figure 4:
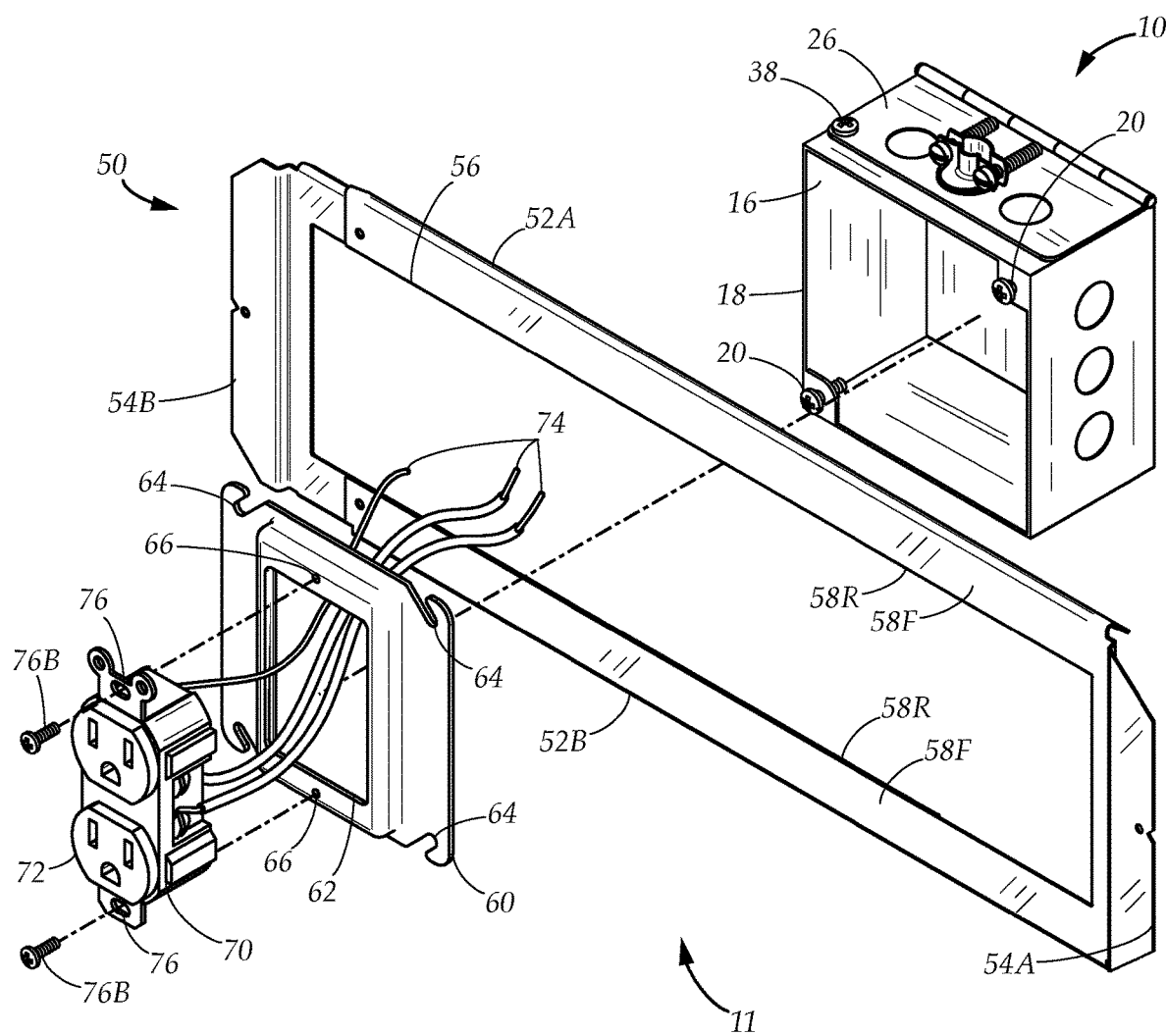
FIG. 4 is a diagrammatical exploded view of an electrical box and mounting bracket assembly comprising the improved access electrical box, an electrical box mounting bracket, a device mounting bracket, and an installed device, in accordance with an embodiment of the present disclosure.
Figure 6:
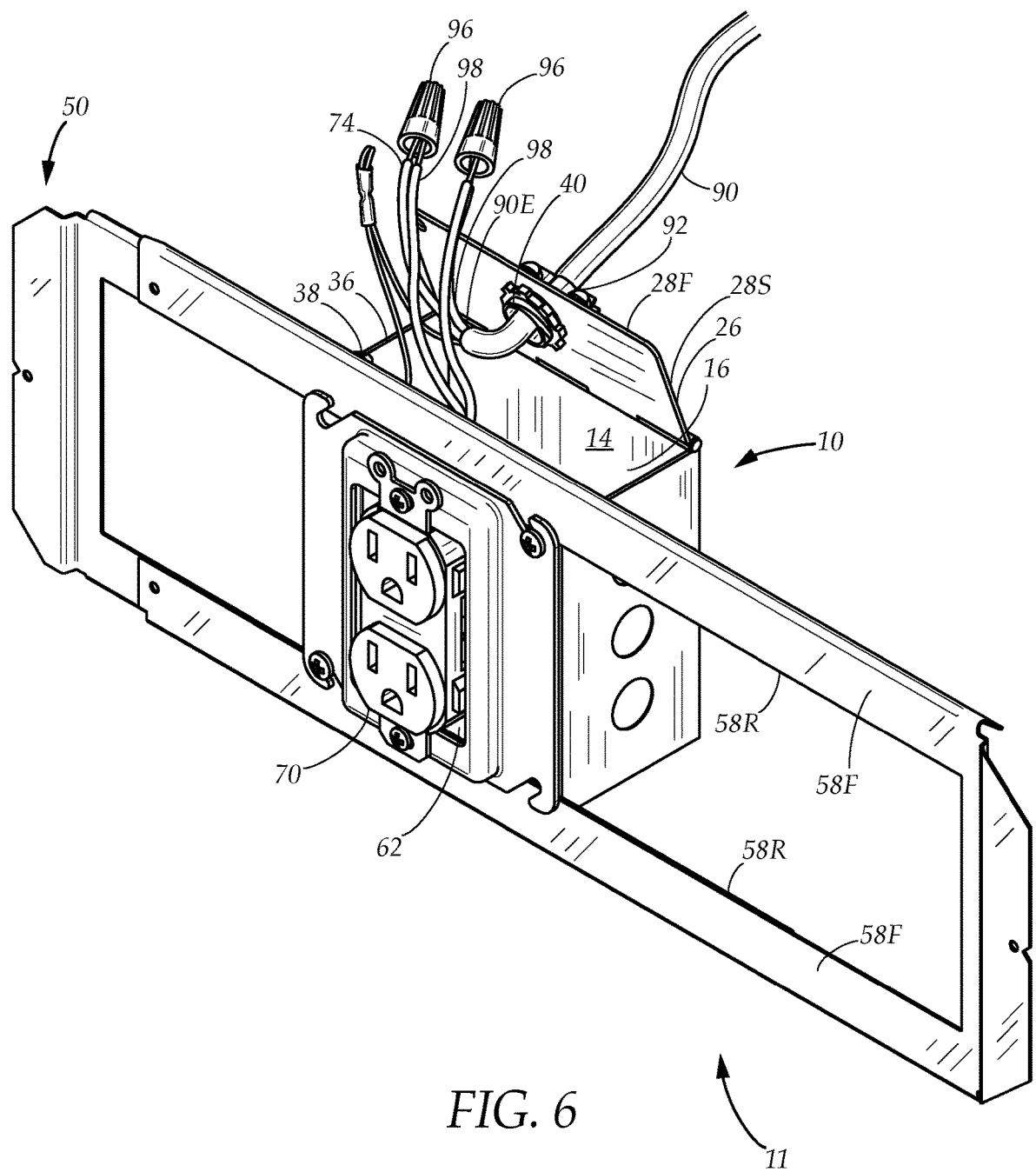
FIG. 6 is a diagrammatical perspective view of the assembled electrical box and mounting bracket assembly, whereby the movable access panel is placed in the open position to reveal the interior space of the electrical box while a conduit containing conduit wires is inserted through the conduit connector, allowing the device wires and the conduit wires to be spliced together using wire connectors, in accordance with an embodiment of the present disclosure.

FIG. 1 illustrates an improved access electrical box 10 adapted to enclose electrical connections for integration into a wiring or electrical system, comprising a plurality of box panels including a top panel 12T, a bottom panel 12B, a left panel 12L, a right panel 12R, and a rear panel 14. The improved access electrical box 10 further has an interior space 16 defined by the plurality of box panels. The interior space 16 opens forwardly through a front opening which is defined by the top, bottom, left, and right panels 12T, 12B, 12L, 12R collectively. The improved access electrical box 10 further comprises a movable access panel 26 which is positioned between the top panel 12T and the rear panel 14. The movable access panel 26 has a front edge 28F, a pair of side edges 28S, and a hinge 26H located opposite the front edge 28F, which joins the movable access panel 26 to the rear panel 14. The movable access panel 26 further has a panel surface 30 which extends between the front edge 28F, the side edges 28S, and the hinge 26H. The improved access electrical box 10 further comprises at least one wiring aperture 40 which can be disposed on any of the box panels or the panel surface 30 of the movable access panel 26. The improved access electrical box 10 further comprises a plurality of front mounting points 20 which can be positioned anywhere along the front opening 18. Turning briefly to FIGS. 4 and 6, the improved access electrical box 10 is adapted to house an installed device 70 having a plurality of device wires 74. The device wires 74 may be contained within the interior space 16 or be drawn through the wiring aperture 40. Integration of the installed device 70 with the wiring system requires the device wires 74 to be connected to a plurality of conduit wires 98 contained with a conduit 90.

Figure 2:
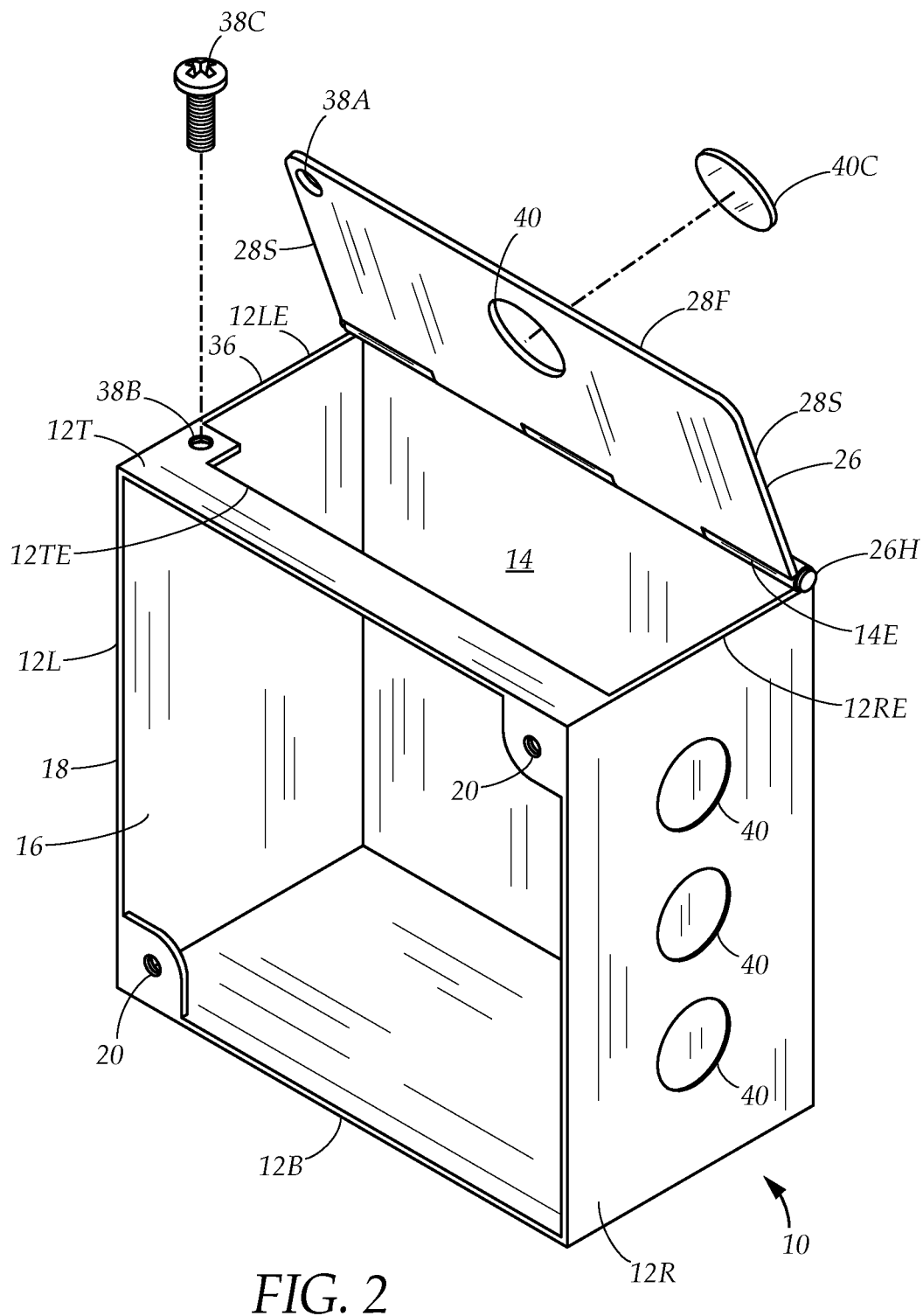
FIG. 2 is a diagrammatical perspective view of the improved access electrical box with the movable access panel in an open position, revealing a top opening through which the interior space of the electrical box is accessible, in accordance with an embodiment of the present disclosure.

Turning now to FIG. 2, the right panel 12R has a right panel top edge 12RE, the left panel 12L has a left panel top edge 12LE, and the rear panel 14 has a rear panel top edge 14E. The top panel 12T is connected to and is substantially coplanar with the left and right panel top edges 12LE, 12RE. The top panel 12T is also substantially coplanar with, but does not contact, the rear panel top edge 14E. The top panel 12T therefore has a top panel edge 12TE which extends along the top panel 12T between the left and right panels 12L, 12R and is opposite to the front opening 18. The top panel edge 12TE, and the left, right, and rear panel top edges 12LE, 12RE, 14E define a top opening 36. The interior space 16 further opens upwardly and is accessible through the top opening 36. The movable access panel 26 is adapted to be hingedly raised and lowered between an open position and a closed position. The top opening 36 is covered by the movable access panel 26 when in the closed position. The hinge 26H is connected to the rear panel top edge 14E, and the front edge 28F of the movable access panel 26 rests upon the top panel 12T while the side edges 28S fully cover the top opening 36 between the left and right panel top edges 12LE, 12RE. Positioning the movable access panel 26 in the open position uncovers and exposes the top opening 36. In a preferred embodiment, the hinge 26H provides the movable access panel 26 with a range of motion which exceeds one-hundred-eighty degrees relative to the top panel 12T.

Figure 7:
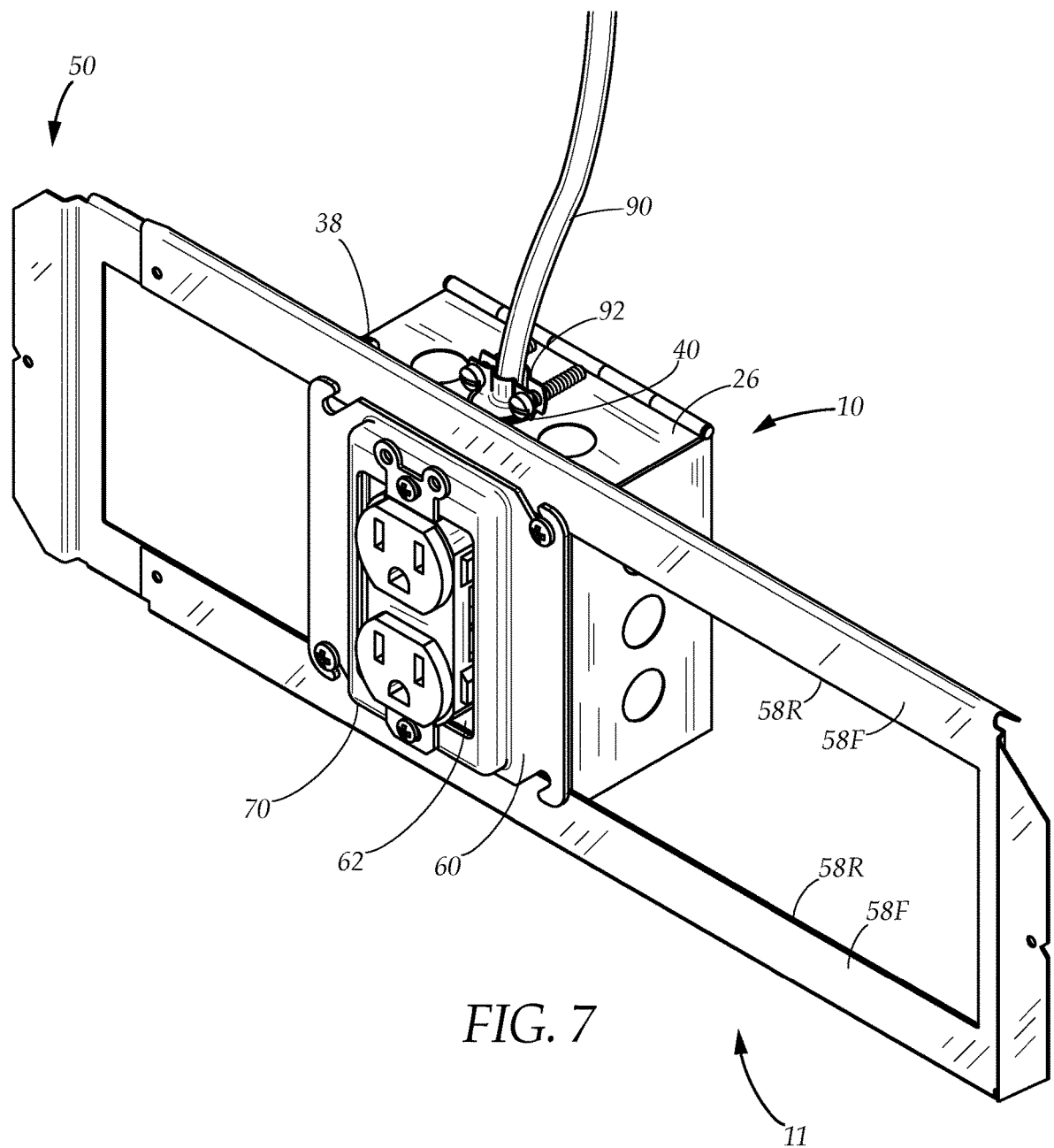
FIG. 7 is a diagrammatical perspective view of the assembled electrical box and mounting bracket assembly where the movable access panel is placed in the closed position once the device wires and the conduit wires are spliced together and lowered into the interior space of the improved access electrical box, in accordance with an embodiment of the present disclosure.

The improved access electrical box 10 allows a user to gain access to the interior space 16 through the top opening 36 in addition to the front opening 18. Turning momentarily to FIG. 6 while continuing to refer to FIG. 2, the user may, for example, position the movable access panel 26 in the open position in order to perform splices using wire connectors 96 to join a plurality of device wires 74 and a plurality of conduit wires 98 even when access to the front opening 18 is blocked. When the user has completed the splices, the device wires 74 and the conduit wires 98 may simply be lowered into the interior space 16. The user may then position the movable access panel 26 in the closed position, as shown in FIG. 7.

Returning to FIGS. 1-2, the movable access panel 26 may be locked in the closed position using an access panel locking mechanism 38, to ensure that the movable access panel 26 cannot be opened unintentionally. In a preferred embodiment, the movable access panel 26 comprises an access panel screw hole 38A disposed on the movable access panel surface 30, and a top panel screw hole 38B disposed on the top panel 12T which is aligned with the access panel screw hole 38A. The movable access panel 26 is locked in the closed position by a locking screw 38C which passes through the access panel and the top panel screw holes 38A, 38B. The user may lock or unlock the movable access panel 26 as required by removing or replacing the locking screw 38C. Note that this example is non-limiting, and the access panel locking mechanism 38 may be implemented using a variety of different locking means and devices.

Figure 3:
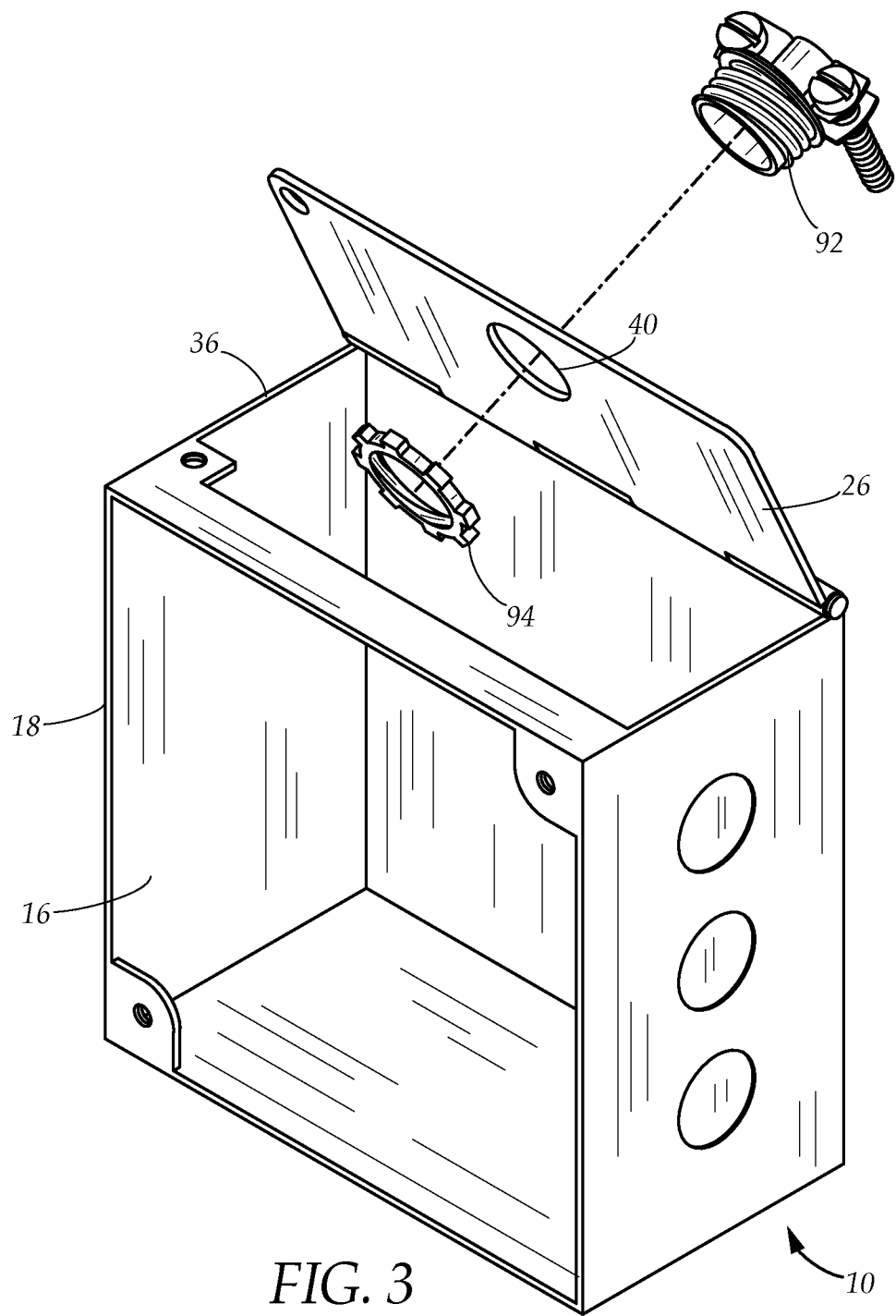
FIG. 3 is a diagrammatical perspective view of the improved access electrical box, further depicting a wiring aperture located on the movable access panel which is adapted to accept a conduit connector, in accordance with an embodiment of the present disclosure.

Referring now to FIG. 3 while continuing to refer to FIG. 2, the wiring aperture 40 may be blocked by a removable cover 40C which can be removed by the user. For example, the removable cover 40C may correspond to a knockout commonly used in electrical boxes. Unblocking the wiring aperture 40 allows wires, cables, conduits, and the like, to be drawn outwardly from within the interior space 16 through the wiring aperture, or be inserted into the interior space 16. Turning now to FIG. 6 while continuing to refer to FIG. 3, the wiring aperture 40 is also adapted to accept a conduit connector 92, which is inserted into the wiring aperture 40 and secured using a connector nut 94. The conduit connector 92 is adapted to attach to the conduit 90 and may be a clamp-type connector, an EMT connector, or any connector appropriate for the conduit 90.

Turning now to FIG. 4, the improved access electrical box 10 may be attached to an electrical box mounting bracket 50, which is used to secure the improved access electrical box 10 within a supporting structure. For example, the supporting structure may comprise two vertical structural elements such as wall studs or vertical beams. The improved access electrical box 10 and the electrical mounting bracket 50 may therefore form a mounted electrical box assembly 11. The mounted electrical box assembly 11 further includes a device mounting bracket 60 and an installed device 70. The installed device 70 may be one or more electric receptacles 72 or electrical outlets, as depicted in the example shown in FIG. 4. Alternatively, the installed device 70 may be a data outlet, electrical switch, fuse or circuit breaker, or any other electrical connector or apparatus which is commonly installed with an electrical box. The installed device 70 further has a plurality of device wires 74 leading from the installed device 70, and a plurality of device mounting points 76. The device wires 74 may be electrical wires for transmitting electrical power, data cables, or a combination of both, while the device mounting points facilitate the mounting of the installed device 70 to the device mounting bracket 60.

Figure 5A:
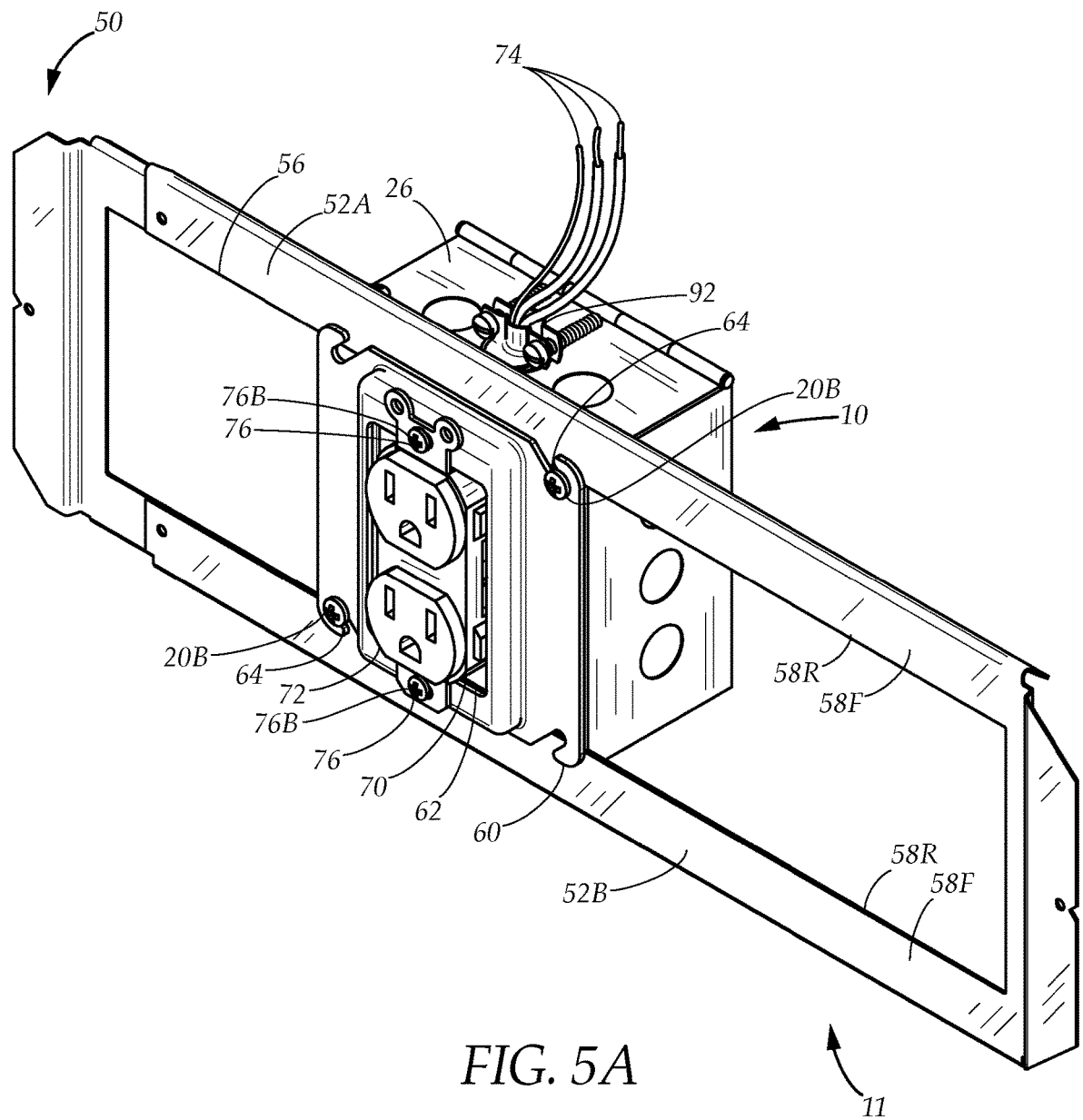
FIG. 5A is a diagrammatical perspective view of the assembled electrical box and mounting bracket assembly, where the installed device and the device mounting bracket are secured to the improved access electrical box and the device wires leading from the device are drawn through interior space and upwardly through the wiring aperture so that they protrude from the conduit connector, in accordance with an embodiment of the present disclosure.
Figure 5B:
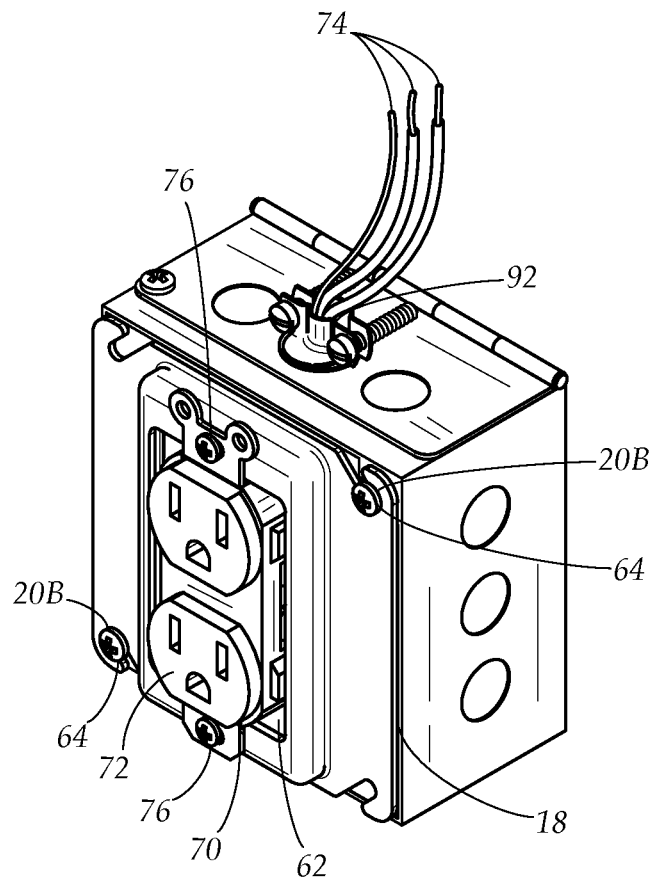
FIG. 5B is a diagrammatical perspective view of the improved access electrical box with the installed device and the device mounting bracket secured directly to the improved access electrical box without the electrical box mounting bracket, in accordance with an embodiment of the present disclosure.

Turning to FIGS. 5A-B while also referring to FIG. 4, the device mounting bracket 60 is adapted to secure the installed device 70 to the improved access electrical box 10 and/or the electrical box mounting bracket 50, and has a device mounting opening 62 and a plurality of attachment points 64. The device mounting opening 62 is adapted to accept the installed device 70 and allow the device wires 74 to pass through the device mounting opening 62 towards the front opening 18 of the improved access electrical box 10. The device mounting bracket 60 may further have a plurality of device mounting holes 66 which align with the device mounting points 76. The attachment points 64 are adapted to allow the device mounting bracket to be secured to the improved access electrical box 10 and/or the electrical box mounting bracket 50.

The electrical box mounting bracket 50 may have a pair of vertical supports arranged in parallel, comprising a right vertical support 54A and a left vertical support 54B, and a pair of mounting arms arranged in parallel and extending therebetween, corresponding to an upper mounting arm 52A and a lower mounting arm 52B. The electrical box mounting bracket 50 also has a mounting bracket opening 56 which is formed between the right and left vertical supports 54A, 54B and the upper and lower mounting arms 52A, 52B. The upper and lower mounting arms 52A, 52B further define a mounting bracket front face 58F, and a mounting bracket rear face 58R disposed opposite the mounting bracket front face 58F.

Referring to FIG. 5A as well as FIG. 4 and FIG. 1, the improved access electrical box 10 is attached to the mounting bracket rear face 58R such that the front opening 18 is accessible through the mounting bracket opening 56. The device mounting bracket 60 is then attached to the mounting bracket front face 58F. In a preferred embodiment, the attachment points 64 of the device mounting bracket 60 are adapted to align with the front mounting points 20 of the improved access electrical box 10. Using a plurality of front mounting screws 20B, the device mounting bracket 60 is secured in place and the upper and lower mounting arms 52A, 52B of the electrical box mounting bracket 50 are firmly held between the device mounting bracket 60 and the improved access electrical box 10. Referring also to FIG. 5B, the device mounting bracket 60 may be attached directly to the front mounting points 20 of the improved access electrical box 10 without the electrical box mounting bracket 50.

Turning now to FIG. 6 while continuing to refer to FIG. 4 and FIG. 5A-B the installed device 70 is secured to the device mounting bracket 60 by aligning the device mounting points 76 with the device mounting point holes 66 of the device mounting bracket, and fastening the installed device in place using a plurality of device mounting screws 76B. Once secured, the installed device 70 is held in place within the device mounting opening 62, allowing the device wires 74 to pass through the front opening 16 of the improved access electrical box 10 into the interior space 16. The device wires 74 can be left within the interior space 16, but may also be drawn upwardly through the wire aperture 40 and the conduit connector 92. In certain embodiments, the electrical box and mounting bracket assembly may be provided to the user in a pre-assembled state in which the improved access electrical box 10, the electrical box mounting bracket 50, the device mounting bracket 60, and the installed device 70 are fully assembled. The user may simply secure the electrical box mounting bracket 50 to the supporting structure and draw the conduit 90 and conduit wires 98 to the improved access electrical box 10 without being required to assemble the electrical box and mounting bracket assembly 11. The conduit connector 92 may be provided separately, allowing the user to select and attach the appropriate type of conduit connector 92 for the conduit 90.

Typically, the device wires 74 and the conduit wires 98 are spliced after the electrical box and mounting bracket assembly 11 is already installed within the supporting structure. This limits the user's ability to freely manipulate or reposition the improved access electrical box 10 prior to performing the required splices. However, the movable access panel 26 allows the device wires 74 and the interior space 16 to remain accessible to the user through the top opening 36 even when access to the interior space through the front opening 18 is blocked by the installed device 70. Furthermore, when the movable access panel 26 is in the open position, the conduit 90 and/or the conduit wires 98 may be threaded through the conduit connector 92 and the wire aperture 40 so that the user may splice the device wires 74 and the conduit wires 98 either within or directly above the interior space 16. Referring back to FIG. 3 while continuing to refer to FIG. 6, opening the movable access panel 26 also allows the user to remove or attach the conduit connector 92 even when the installed device 70 is secured to the improved access electrical box 10, particularly when removal or attachment of the conduit connector 92 requires access to the connector nut 94. This feature allows the user to remove or attach the conduit connector 92 at any time simply by opening the movable access panel 26, and fastening or removing the conduit connector 92 and the connector nut 94.

On the other hand, the interior space of a conventional prior art electrical box without a movable access panel is only accessible through the device mounting opening. When working with the prior art electrical box, the user can perform the required splices by detaching the installed device from the electrical box, splicing the device wires with the conduit wires, pushing the spliced device wires and conduit wires along with any wire connectors through the front opening, and then securing the installed device in place. Alternatively, the user can thread the device wires upwardly through wire aperture and the conduit connector 92 so that the device wires are exposed, allowing the user to splice the device wires to the conduit wires without removing the installed device. However, the spliced wires along with their wire connectors must then be pushed through the conduit connector and the wiring aperture so that they are fully contained within the interior space. When the spliced wires and wire connectors are pushed through the wiring aperture or the device mounting opening the spliced wires may become detached or even cut as they are pushed through the narrow wiring aperture or device mounting opening, resulting in a broken electrical connection, potentially lengthy delays for troubleshooting, as well as dangerous short circuits.

Turning now to FIG. 7 while continuing to refer to FIG. 6, once the user has completed the required splices, the device wires 74, conduit wires 98, and any wire connectors 96 are lowered into the interior space 16, and the movable access panel 26 may then be placed in the closed position. The movable access panel 26 may then be locked into place via the access panel locking mechanism 38. In situations where force is applied to the conduit 90, such as by the conduit being pulled, the locked movable access panel 26 will remain closed.

Figure 8:
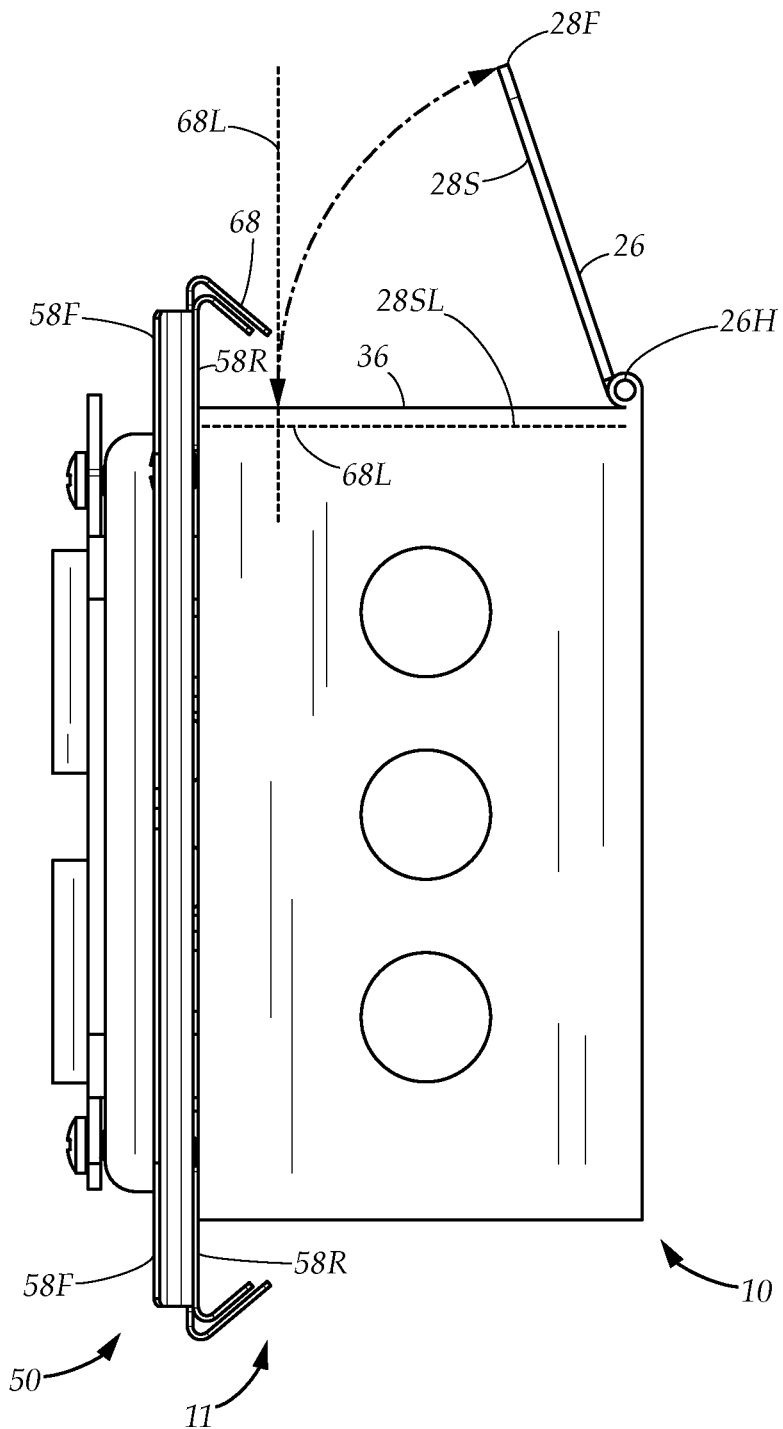
FIG. 8 is a diagrammatical side view of the electrical box and mounting bracket assembly, where the electrical box mounting bracket has a rear lip which assists in the retention of the improved access electrical box, and the movable access panel is adapted to open and close without interference from the rear lip, in accordance with an embodiment of the present disclosure.

Referring now to FIG. 8, the electrical box and mounting assembly 11 is viewed from the side. The electrical box mounting bracket 50 may further have a rear lip 68 which projects away from the mounting bracket rear face 58R. The rear lip 68 may function to facilitate the retention of the improved access electrical box 10 in position against the electrical box mounting bracket 50. The movable access 26 may be adapted to freely open and close without interference from the rear lip 68. For example, the rear lip 68 may project away from the mounting bracket rear face 58F up to a line 68L. The movable access panel 26 therefore has a length 28SL which ensures that the access panel front edge 28F does not extend beyond the line 68L, thus avoiding contact between the movable access panel 26 and the rear lip 68.

Figure 9:
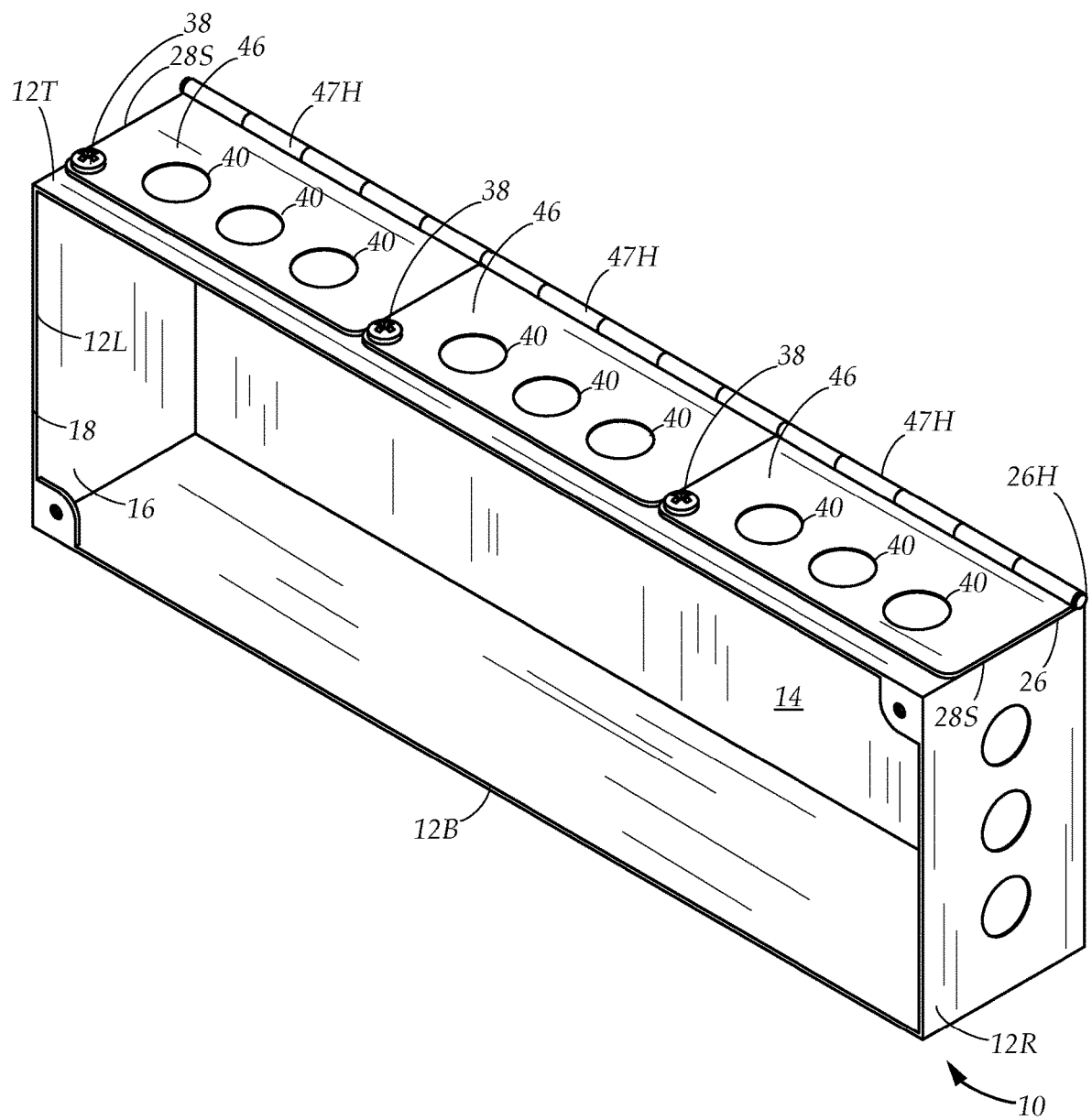
FIG. 9 is a diagrammatical perspective view of an alternate improved access electrical box, showing the movable access panel configured with a plurality of sub-panels which may each be independently opened and closed, in accordance with an embodiment of the present disclosure.
Figure 10:
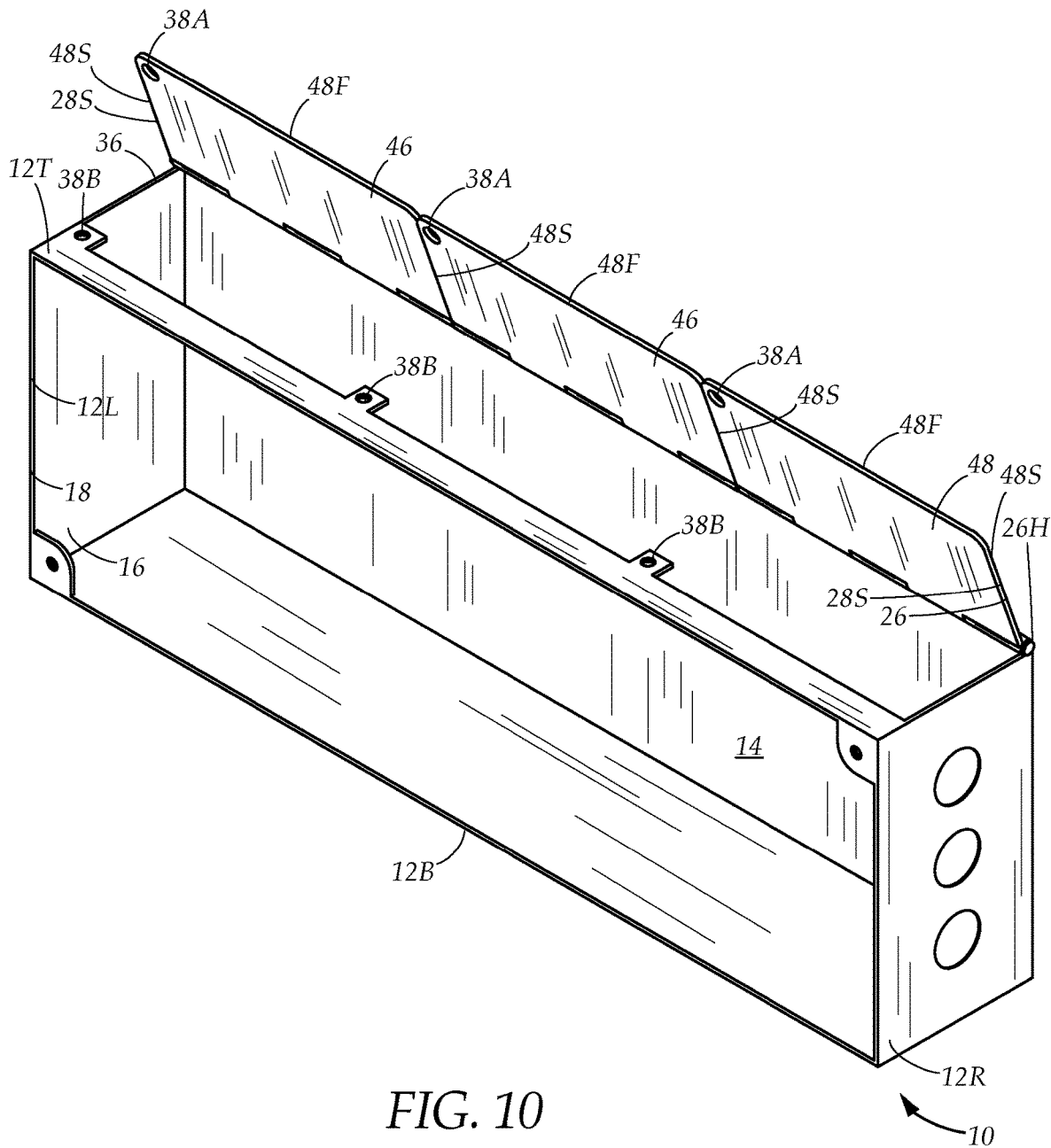
FIG. 10 is a diagrammatical perspective view of an alternate improved access electrical box, showing the sub-panels in the open position, in accordance with an embodiment of the present disclosure.

Continuing now to FIGS. 9-10, in an alternate embodiment, the improved access electrical box 10 may have an expanded configuration in which the movable access panel 26 is divided into a plurality of sub-panels 46. In one embodiment, each sub-panel has a sub-panel front edge, a sub-panel hinge 47H, and a pair of sub-panel side edges 48S. The sub-panel hinges 47H of the sub-panels may be coaxial with each other, and coincident with the hinge 26H of the movable access panel. Each sub-panel 46 is positioned adjacent to another of the sub-panels along at least one of its sub-panel side edges 48S. For example, the movable access panel 26 may comprise three individual sub-panels 46 disposed between the two access panel side edges 28S. Each sub-panel 46 is capable of opening and closing between the open position and the closed position independently of the other sub-panels, and may have one or more wiring apertures. Each sub-panel 46 may also be capable of being locked in the closed position via an access panel locking mechanism 38 in the same manner as the movable access panel 26. The improved access electrical box 10 may, in the expanded configuration, be adapted to house multiple installed devices, with each installed device being linked to a different conduit via one of the sub-panels 46.

Note that in alternate embodiments, the top opening and the movable access panel are not limited to an upward orientation and may instead be oriented towards the right, left, or bottom of the improved access electrical box by simply rotating the improved access electrical box so that the top opening and the movable access panel are oriented towards the new direction. Furthermore, a person of ordinary skill in the art in the field of the invention will appreciate that the improved access electrical box can be configured with varying numbers of box panels while adhering to the principles of the present disclosure. For example, in one alternate embodiment, the box panels may be arranged in an octagonal arrangement with a back panel, and the top opening and the movable access panel may be positioned at any of the box panels.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an improved access electrical box with a movable access panel. The disclosure is illustrated by example in the drawing figures, and throughout the written description. It should be understood that numerous variations are possible, while adhering to the inventive concept. Such variations are contemplated as being a part of the present disclosure.

What is claimed is:

1. An improved access electrical box adapted to contain one or more electrical connections for integrating an installed device with an electrical system, the electrical system having one or more of a conduit containing a plurality of conduit wires, the installed device having a plurality of device wires, the improved access electrical box comprising:

a plurality of box panels having a top panel, a left panel, a right panel, rear panel, and a bottom panel;

a front opening defined by the top panel, the left panel, the right panel, and the bottom panel, the top panel has a top panel edge, the right panel has a right panel top edge, the left panel has a left panel top edge, and the rear panel has a rear panel top edge, the top panel extends between the right panel top edge and the left panel top edge such that the top opening is defined by the top panel edge, the right panel top edge, the left panel top edge and the rear panel top edge:

an interior space defined by the plurality of box panels, adapted for receiving the installed device, the front opening is adapted to allow the installed device to be secured therein, while allowing the device wires to extend through the front opening and into the interior space;

a top opening which provides direct access to the interior space; and a movable access panel adapted to be selectively positioned between a closed and an open position to cover and uncover the top opening, the movable access panel has an access panel front edge, a pair of access panel side edges, and a hinge disposed opposite the access panel front edge, the hinge is connected to the rear panel top edge while the access panel front edge rests upon the top panel when the movable access panel is in the closed position, the hinge further allows the movable access panel to be raised and lowered between the open and the closed position, the movable access panel further having a wiring aperture disposed thereon, the wiring aperture is adapted to allow a user to insert the conduit wires downward into the interior space, whereby the movable access panel is adapted to allow the user to access the interior space through the top opening and splice the device wires and the conduit wires to create the electrical connections while the movable access panel is in the open position, and the improved access electrical box is adapted to enclose the electrical connections within the interior space when the movable access panel is placed in the closed position.

2. The improved access electrical box as described in claim 1, wherein:

the movable access panel further has a conduit connector, the conduit connector is secured within the wiring aperture and is adapted to allow the conduit to be inserted therethrough, the conduit connector is further adapted to fasten the conduit to the movable access panel.

3. The improved access electrical box as described in claim 2, wherein:

the movable access panel further has a selectively lockable access panel locking mechanism adapted to lock the movable access panel in the closed position.

4. The improved access electrical box as described in claim 3, wherein:

the movable access panel further comprises a plurality of sub-panels, each sub-panel having a sub-panel hinge, a sub-panel front edge, a pair of sub-panel side edges, and a sub-panel wiring aperture, each sub-panel is positioned adjacent to another sub-panel such that the sub-panels collectively cover the top opening from the right panel top edge to the left panel top edge, and the sub-panel hinge of each sub-panel is coincident with the hinge of the movable access panel and each sub-panel is adapted to be selectively raised and lowered independently; and the improved access electrical box further comprises an additional installed device for each sub-panel, and each sub-panel is adapted to allow the user to access the interior space and splice the device wires of one of the additional installed devices with the conduit wires of one of the conduits while the sub-panel is in the open position.

5. An improved access electrical box and mounting bracket assembly adapted to contain one or more electrical connections for integration with an electrical system, the electrical system is contained with a supporting structure and has one or more of a conduit containing a plurality of conduit wires, the improved access electrical box and mounting bracket assembly comprising:

an electrical box mounting bracket adapted to be secured to the supporting structure; and an improved access electrical box adapted to be secured to the electrical box mounting bracket, having:

a plurality of box panels having a top panel, a left panel, a right panel, rear panel, and a bottom panel, the top panel has a top panel edge, the right panel has a right panel top edge, the left panel has a left panel top edge, and the rear panel has a rear panel top edge;

a front opening defined by the top panel, the left panel, the right panel, and the bottom panel a device mounting bracket having a device mounting opening which is aligned with the front opening and is secured to one or more of the box panels;

an interior space defined by the plurality of box panels, adapted for receiving an installed device having a plurality of device wires, said installed device secured to the device mounting bracket while the device wires extend through the device mounting opening and front opening and into the interior space;

a top opening which provides direct access to the interior space, the top panel extends between the right panel top edge and the left panel top edge such that the top opening is defined by the top panel edge, the right panel top edge, the left panel top edge and the rear panel top edge; and a movable access panel adapted to be selectively positioned between a closed and an open position to cover and uncover the top opening, the movable access panel further has an access panel front edge, a pair of access panel side edges, and a hinge disposed opposite the access panel front edge, the hinge is connected to the rear panel top edge while the access panel front edge rests upon the top panel when the movable access panel is in the closed position, the hinge further allows the movable access panel to be raised and lowered between the open and the closed position, the movable access panel further having a wiring aperture disposed thereon, the wiring aperture is adapted to allow a user to insert the conduit wires downward into the interior space, whereby the movable access panel is adapted to allow the user to access the interior space through the top opening and splice the device wires and the conduit wires to create the electrical connections while the movable access panel is in the open position, and the movable access panel is further adapted to enclose the electrical connections within the interior space when the movable access panel is placed in the closed position.

6. The improved access electrical box and mounting assembly as described in claim 5, wherein:

the movable access panel further has a conduit connector, the conduit connector is secured within the wiring aperture and is adapted to allow the conduit to be inserted therethrough, the conduit connector is further adapted to fasten the conduit to the movable access panel.

7. The improved access electrical box and mounting assembly as described in claim 6, wherein:

the movable access panel further has a selectively lockable access panel locking mechanism adapted to lock the movable access panel in the closed position.

8. The improved access electrical box and mounting assembly as described in claim 7, wherein:

the electrical box mounting bracket further has a right vertical support, a left vertical support, and an upper mounting arm and a lower mounting arm which are positioned in parallel and extend between the right and left vertical supports to define a mounting bracket opening;

the device mounting bracket is secured to the box panels such that the electrical box mounting bracket is fastened between the device mounting bracket and the front opening; and the installed device is secured to the device mounting bracket such that the device wires further extend through the mounting bracket opening.

9. The improved access electrical box and mounting bracket assembly as described in claim 8, wherein:

the electrical box mounting bracket further has a rear lip which projects rearwardly towards the improved access electrical box above the top edge; and the movable access panel has a length which ensures the access panel front edge does not contact the rear lip as it is raised and lowered between the open and the closed positions.

10. The improved access electrical box and mounting bracket assembly as described in claim 9, wherein:

the movable access panel further has a plurality of sub-panels, each sub-panel having a sub-panel hinge, a sub-panel front edge, a pair of sub-panel side edges, and a sub-panel wiring aperture, each sub-panel is positioned adjacent to another sub-panel such that the sub-panels collectively cover the top opening from the right panel top edge to the left panel top edge, and the sub-panel hinge of each sub-panel is coincident with the hinge of the movable access panel and each sub-panel is adapted to be selectively raised and lowered independently;

the improved access electrical box further has an additional installed device for each sub-panel, and each sub-panel is adapted to allow the user to access the interior space and splice the device wires of one of the additional installed devices with the conduit wires of one of the conduits while the sub-panel is in the open position.

* * * * *